R. JACOBUCCI.
TROLLEY FINDER.
APPLICATION FILED SEPT. 21, 1914.
1,126,018.
Patented Jan. 26, 1915.
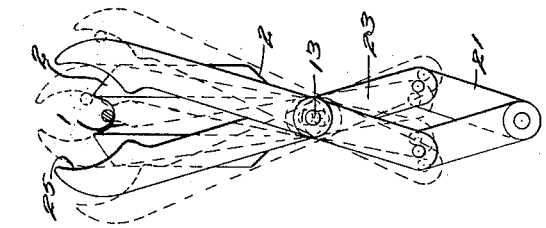
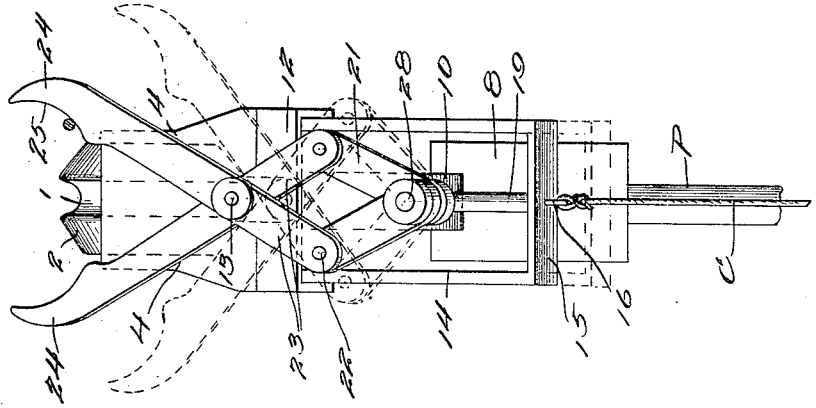
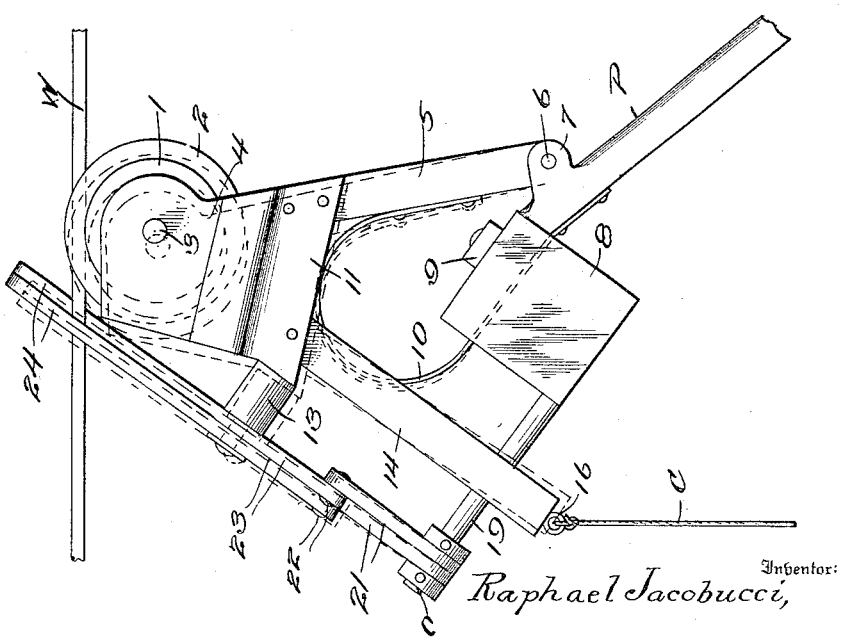

UNITED STATES PATENT OFFICE.

RAPHAEL JACOBUCCI, OF FALL RIVER, MASSACHUSETTS.

TROLLEY-FINDER.

1,126,018.  Specification of Letters Patent.  Patented Jan. 26, 1915.

Application filed September 21, 1914. Serial No. 863,005.

*To all whom it may concern:*

Be it known that I, RAPHAEL JACOBUCCI, a citizen of the United States, residing at Fall River, in the county of Bristol and State of Massachusetts, have invented certain new and useful Improvements in Trolley-Finders; and I do hereby declare the following to be a full, clear, and exact description of the invention, such as will enable others skilled in the art to which it appertains to make and use the same.

This invention relates to electric railways, and more especially to trolley finders; and the object of the same is to produce a device of this kind whereby the trolley wire will be guided to and held upon the trolley wheel under all ordinary circumstances, and whereby it may be positively placed upon the wheel if it has become hopelessly displaced. This and other objects are carried out by constructing the trolley finder in the manner hereinafter more fully described and claimed, and as shown in the drawings wherein:—

Figure 1 is a side elevation of this device complete, showing the parts in full lines in the position they assume when the wheel is running along the wire and the finder elements are at rest, and in dotted lines the position which the parts assume just as the wire jumps from the wheel. Fig. 2 is a rear elevation, showing the parts in full lines in the same position as they are illustrated in dotted lines in Fig. 1, and Fig. 2 shows in dotted lines the position the parts assume when the operator draws upon the cord. Fig. 3 is a diagrammatic elevation showing the two jaws in various positions and illustrating how they automatically replace the wire upon the wheel.

In the drawings the letter W designates the wire, and P the trolley pole, the latter being usually spring-supported from the top of the car and its free end drawn downward by means of a cord C. The trolley wheel 1 in the present invention I would make with its flanges 2 beveled off on the outer side as shown. The wheel is mounted on an axle or pin 3 through the upper ends of fork-arms 4, the shank 5 of said fork being pivoted at 6 between two lugs or ears 7 rising from the pole P. The latter is continued to the rear of said lugs and carries a head numbered 8, the same being of any suitable construction but by preference having on its upper side a stop 9 for a purpose to appear below. A spring 10 connects this head with the under side of the fork-shank 5 as shown, the tendency of this spring being to throw the shank of the yoke or fork upward and therefore move the wheel to a point relatively higher than the rear end of the pole P. Projecting obliquely to the rear from the fork-arms are two bars 11 whose rear ends are connected by a cross bar 12, the latter forming a support for a pin 13 which stands in rear of and beneath the trolley wheel. Rigidly depending from the frame made up of said bars 11 and 12 is another frame 14 through which the spring may project if it be large enough, and the lower cross bar 15 of this frame carries an eye 16 to which the cord C is attached. Carried beneath and projecting rearwardly from the head 8 is a rod or pin 19 which projects through the frame 14 to the point 20. Pivotally mounted on this pin at the point 20 is a pair of links 21, and pivotally connected at 22 to the upper ends of these links are two other links 23 which cross each other and are pivotally mounted on the pin 13, their upper ends having jaws 24 whose inner edges 25 are curved outward as best seen in Fig. 3 and disposed at a point where they will embrace the wire W. The entire device is preferably of metal, and details of construction are unimportant.

In operation, the wire W travels in the groove of the trolley wheel and the parts stand normally as seen in full lines in Fig. 1, the spring which supports the pole P bearing its rear end upward to such extent and with such force that the leaf spring 10 is compressed slightly and the jaws 24 are a little open so that the wire may pass between them without touching either of them. If now the wheel should jump the wire, the latter no longer bears it downward and the spring 10 opens a little so that the wheel rises. The result is that its beveled edges 2 direct the wire laterally against one of the jaws 24. However, just at this time these jaws stand inclined as shown in the drawings, with the result that the jaws direct the wire back into the groove of the wheel. If the wire should become hopelessly out of place, the car is stopped and the operator draws down on the cord C. The result is that the frame 14 which is connected by the bars 11 with the wheel and its fork or yoke moves downward, carrying the pivot 13 downward; while the head at the upper end of the pole moves upward, carrying the pivot 20 upward. The toggle-lever or lazy-tongs structure comprising the links 21 and 23, is therefore opened so that the jaws 24 are thrown wide apart and they may be easily put under the wire W. The operator then releases tension on the cord C, when the entire device rises to proper position, and the approach of the jaws 24 toward each other causes the wire to be lifted above the wheel, back into whose groove it falls.

The purpose of the stop or rib 9 is to make contact with the under side of the shank of the fork when the cord C is drawn downward vigorously and the spring supporting the trolley pole (not shown) is quite strong. I would not have a pull upon the cord C open the jaws further than to a horizontal, or perhaps not quite so far, because the jaws might then hook over the wire which it was sought to hook under, and the presence of the stop 9 prevents. The framework structure consisting of the side bars 11, cross bar 12 connecting their rear ends, and pendant frame 14, surrounds and incloses the leaf spring 10 and gives the latter the freedom of movement which is required for its successful operation.

What is claimed as new is:

1. In a trolley finder, the combination with a pole, a fork, a wheel therein, a pivotal connection between the shank of the fork and the pole, and a spring between the rear end of said pole and said fork throwing the latter normally upward; of the fork extending pivotal pins carried by the fork and the pole respectively, and lazy-tongs mounted on said pins and with their upper links carrying jaws standing astride the trolley wire, for the purpose set forth.

2. In a trolley finder, the combination with a pole, a fork, a wheel therein, a pivotal connection between the shank of the fork and the pole, and a spring between the rear end of said pole and said fork throwing the latter normally upward; of side bars projecting rigidly to the rear from the arms of said fork, a rigid frame pendant from said side bars, connections between a trolley cord and the lower portion of said frame, a pivot pin projecting rearwardly from its upper cross bar, another pivot pin projecting rearwardly from said pole, and lazy-tongs mounted on said pins and with their upper links carrying jaws standing astride the trolley wire, for the purpose set forth.

3. In a trolley finder, the combination with a pole having a head at its upper end and lugs rising from said pole forward of the head, a wheel, a fork between whose arms it is pivoted, the shank of the fork being pivoted to said lugs, and a spring connecting said head with the fork and throwing the latter normally upward; of a framework extending rigidly to the rear of said fork and thence downward behind the said fork and thence downward behind the head and carrying means for attachment of a trolley cord, a cross bar in such framework just beneath the wheel, a pivot pin projecting to the rear from this cross bar, a second pivot pin projecting to the rear from said head, and lazy-tongs mounted on said pins and with their upper links carrying jaws standing astride the trolley wire, for the purpose set forth.

4. In a trolley finder, the combination with a pole having a head at its upper end and lugs rising from said pole forward of the head, a wheel, a fork between whose arms it is pivoted, the shank of the fork being pivoted to said lugs, a stop across the upper side of said head, and a leaf spring connected at its extremities with said fork an dhead and bowed to the rear of said extremities; of a framework extending rigidly to the rear of said fork and thence downward and standing astride said spring, a pivot pin projecting to the rear from said framework, a second pivot pin projecting to the rear from said head, and lazy-tongs mounted on said pins and with their upper links carrying jaws standing astride the trolley wire, for the purpose set forth.

5. In a trolley finder, the combination with a pole, a wheel, a fork in which the latter is mounted, pivotal connections between the fork and pole, and yielding means for throwing the fork normally upward with respect to the pole, of a pin carried by the fork, a second pin carried by the pole, and lazy-tongs mounted on said pins and whose upper arms carry jaws, the inner edges of said jaws being curved away from each other and upward from the uppermost pin, for the purpose set forth.

In testimony whereof I affix my signature in presence of two witnesses.

RAPHAEL JACOBUCCI.

Witnesses:
LUCIO SPAGNOLI,
HAROLD E. CLARKIN.

Copies of this patent may be obtained for five cents each, by addressing the "Commissioner of Patents, Washington, D. C."